United States Patent [19]
Nakaya
[11] 3,723,762
[45] Mar. 27, 1973

[54] SAW-TOOTH WAVE GENERATORS

[75] Inventor: Naohisa Nakaya, Tokyo, Japan
[73] Assignee: Iwatsu Electric Company, Ltd., Tokyo, Japan

[22] Filed: July 30, 1971
[21] Appl. No.: 167,658

[30] Foreign Application Priority Data

July 28, 1970 Japan ........................45/65557
July 28, 1970 Japan ........................45/65558

[52] U.S. Cl. ..................307/228, 307/246, 307/300, 307/318, 307/319, 328/184
[51] Int. Cl. ..........................................H03k 4/08
[58] Field of Search......307/228, 246, 318, 319, 300; 328/181–185

[56] References Cited

UNITED STATES PATENTS

| | | | |
|---|---|---|---|
| 3,150,271 | 9/1964 | Robertson | 328/184 X |
| 3,497,614 | 2/1970 | Petrocelli et al. | 307/228 X |
| 3,060,330 | 10/1962 | Trampel | 307/318 X |
| 3,395,293 | 7/1968 | Perloff | 307/228 |
| 2,927,223 | 3/1960 | Meirowitz | 307/310 |

*Primary Examiner*—Stanley D. Miller, Jr.
*Attorney*—Chittick, Pfund, Birch, Samuels & Gauthier

[57] ABSTRACT

In a saw-tooth wave generator of the type comprising a capacitor, a source of switching signals and a switching diode connected between the capacitor and the source of switching signals so as to alternately charge and discharge the capacitor, there is provided a series circuit including a second diode having a polarity opposite to that of the switching diode with reference to the capacitor, the series circuit being connected in parallel with the capacitor whereby the storage current of the switching diode is substantially compensated for by the storage current of the second diode.

8 Claims, 11 Drawing Figures

INVENTOR
NAOHISA NAKAYA

BY Chittick, Pfund, Birch, Samuels & Gauthier
ATTORNEYS

INVENTOR
NAOHISA NAKAYA

BY Chittick, Pfund, Birch, Samuels & Gauthier
ATTORNEYS

INVENTOR
NAOHISA NAKAYA

BY Chittick, Pfund, Birch, Samuels & Gauthier
ATTORNEYS

SAW-TOOTH WAVE GENERATORS

BACKGROUND OF THE INVENTION

This invention relates to a saw-tooth wave generator and more particularly to an improved saw-tooth wave generator wherein the saw-tooth wave is generated by the charging and discharging of a capacitor. The invention is also related to a delayed pulse generator utilizing the output of the improved saw-tooth wave generator.

FIG. 1 of the accompanying drawing shows a basic connection diagram of a prior art saw-tooth wave generator comprising a capacitor 4 and a switching diode 2 which is used to charge and discharge capacitor 4 so as to utilize the terminal voltage across the capacitor as a saw-tooth wave. More specifically, one terminal of a signal source 1 producing a switching signal P is grounded and the other terminal is connected to the cathode electrode of switching diode 2, the anode electrode thereof being connected to the juncture 3 between the output of a source of charging current 5 and one terminal of capacitor 4. The polarity of source 5 is selected such that current $I_1$ flows into capacitor 4 via juncture 3. The other terminal of capacitor 4 is grounded and the juncture 3 is connected to an output terminal 6.

In the absence of the switching signal P from source 1, the current $I_1$ from source 5 flows into signal source 1 via diode 2. On the other hand when signal source 1 produces the switching signal P, the diode 2 is rendered nonconductive due to the positive bias provided by the switching signal. For this reason, current $I_1$ can not pass through diode 2 but finds its way to charge capacitor 4. When the switching signal disappears next time, the charge stored in the capacitor discharges through the diode together with current $I_1$. During this operation, the terminal voltage across capacitor 4 or the voltage appearing at output terminal 6 varies as a saw-tooth wave as shown by a dot and dash line 7 in FIG. 2. The dotted line in FIG. 2 represents the switching signal P.

However, with this circuit wherein the saw-tooth wave is generated by the switching operation of diode 2, when the polarity of the voltage applied across the switching diode reverses, the storage time between conductive and non-conductive states of the diode causes the following problem. The term storage time means the interval until the DC resistance component of the diode current reaches a sufficiently large value when discussing the static characteristics of the diode and such a storage time is inherent to all diodes although it varies more or less depending upon the type thereof. During the storage time a reverse current $i_1(t)$ (hereinafter termed the storage current) flows through the diode with the result that during the initial portion of the switching signal both storage current $i_1(t)$ and charging current $I_1$ flow through capacitor 4. Consequently, the saw-tooth wave voltage $V(t)$ provided by capacitor 4 during the storage time t is expressed by the following equation:

$$V(t)=\frac{I_1}{C}t+\frac{1}{C}\int i_1(t)\,dt$$

where C represents the capacitance of capacitor 4.

This saw-tooth wave voltage during the storage time t is shown by a solid line 8 in FIG. 2. After the elapse of the storage time $t$ the capacitor 4 is charged by the current $I_1$, the charging voltage characteristic at this time being shown by the solid line in FIG. 2. For this reason, at the joint between curves 8 and 9 there is formed a bend thus distorting the resulting saw-tooth wave. The wave containing such a distortion can not be used as a saw-tooth wave so that it is necessary to remove the distorted portion and utilize only the straight portion 9 of the wave. Where the capacitance of the capacitor is small this tendency is enhanced.

Where the saw-tooth wave generated by the circuit shown in FIG. 1 is used to drive a delayed pulse generator as shown in FIG. 9, it is impossible to produce a delayed pulse precisely proportional to a reference signal.

A known delayed pulse generator shown in FIG. 9 comprises a saw-tooth wave generator identical to that shown in FIG. 1, and to the juncture 3 between current source 5 and capacitor 4 is connected a comparator 30 comprising a NPN transistor 31 with its base electrode connected to juncture 3, a source of variable reference saw-tooth waves 32 connected between the emitter electrode of transistor 31 and the ground, an Ezaki or tunnel diode 33 with its cathode electrode connected to the collector electrode of transistor 31, a source 34 connected between the anode electrode of Ezaki diode 33 and the ground, and a capacitor 35 connected between the collector electrode of transistor 31 and the output terminal 36 of the circuit.

FIG. **10*a* corresponds to FIG. 2 and curves 7, 8, 9 and P,represent the same voltages whereas FIG. 10*b* shows the delayed pulses appearing at terminal 36**.

The switching pulse P and the reference saw-tooth wave from source 32 are generated synchronously. In the absence of the reverse current or storage current $I_1(t)$ the saw-tooth wave builds-up along curve 7 so that when the terminal voltage across capacitor 4 reaches the level of the reference saw-tooth wave generated by source 32, or the threshold level $l_c$ transistor 31 in the comparator circuit 30 becomes conductive. As the collector current of transistor 31 exceeds the peak current value of Ezaki diode 33 this diode will be quickly switched into conduction thereby producing a delayed pulse 37 at output terminal 36. When signal source 1 provides no switching signal P, capacitor 4 is discharged as above described thus rendering non-conductive transistor 31. As above described, since reference signal source 32 and switching signal source 1 are synchronized, the reference saw-tooth wave also becomes zero at this time.

Due to the inherent storage time, the terminal voltage of the capacitor, however, builds-up along curves 8 and 9 as above described, with the result that the delayed pulse will be produced as at 38 shown in FIG. **10*b*, an interval td earlier than the desired delayed pulse 37**.

To solve this problem, it has been proposed to remove portion 8 and use only portion 9 of the characteristic. With this approach, however, a phase shift (corresponding to interval td shown in FIG. **10*b***) is inevitable between the time at which the switching signal is applied and the instant at which the comparison is made. Compensation of such a phase shift requires a very complicated circuit.

SUMMARY OF THE INVENTION

It is an object of this invention to provide an improved saw tooth wave generator that can eliminate the defects described above.

It is a further object of this invention to provide an improved saw-tooth wave generator in which the effect of storage time can be eliminated.

Another object of this invention is to provide an improved delayed pulse generator utilizing the improved saw-tooth wave generator so as to produce a delayed pulse at a correct time phase.

According to one aspect of this invention, in a saw-tooth wave generator of the class comprising a capacitor, a source of switching signal and a switching diode connected between the capacitor and the source of switching signals so as to alternately charge and discharge the capacitor, there is provided a series circuit including a second diode and a source of voltage. The series circuit is connected in parallel with the capacitor and the polarity of the second diode is made opposite to that of the switching diode with reference to the capacitor whereby the storage current of the switching diode is substantially compensated for by the storage current of the second diode.

According to another aspect of the invention there is provided a delayed pulse generator comprising the improved saw-tooth wave generator just described and a comparator circuit connected to the output terminal of the saw-tooth wave generator. The comparator circuit comprises a source of reference saw-tooth waves synchronized with the source of switching signals of the saw-tooth wave generator, a transistor, the base electrode thereof being connected to the output terminal of the saw-tooth wave generator and the emitter electrode to the source of reference saw-tooth wave, an Ezaki diode with its cathode electrode connected to the collector electrode of the transistor and an output terminal connected to the collector electrode of the transistor through a capacitor.

BRIEF DESCRIPTION OF THE DRAWINGS

In the accompanying drawings:

FIG. 10*a* and *b* are plots to explain the operation of the circuit shown in FIG. 9

Throughout the drawings, corresponiing circuit elements are designated by the same reference symbols.

DESCRIPTION OF THE PREFERRED EMBODIMENTS

Figure 1:
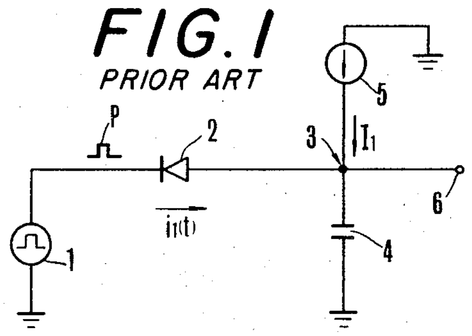
FIG. 1 PRIOR ART
FIG. 1 shows a diagram showing a prior art saw-tooth wave generator mentioned above.
Figure 2:
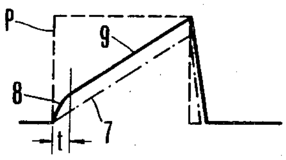
FIG. 2 shows waveforms generated by the circuit shown in FIG. 1.
Figure 3:
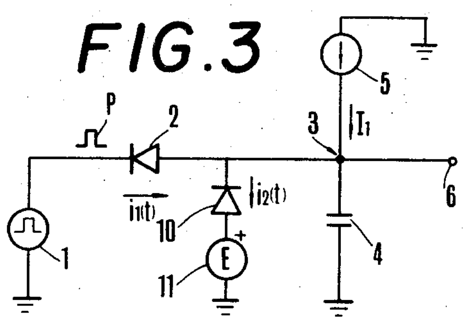
FIG. 3 shows a connection diagram of one example of the improved saw-tooth wave generator embodying the invention.

In a preferred embodiment of the novel saw-tooth wave generator shown in FIG. 3, a series circuit including a source of constant voltage 11 and a second diode 10 is connected in parallel with capacitor 4. The polarity of the second diode 10 is the same as that of the switching diode 2. Since the positive terminal of constant voltage source 11 is connected to the anode electrode of diode 10, in the absence of the switching signal P from signal source 1 diode 10 is rendered conductive. Another elements are connected in the same manner as in the circuit shown in FIG. 1.

With the circuit shown in FIG. 3, when a switching signal P is generated by signal source 1 the switching diode 2 will be biassed in the reverse direction while at the same time the potential at the juncture between the anode electrode of diode 2 and the cathode electrode of diode 10 also becomes positive thus biasing diode 10 in the reverse direction. During this interval capacitor 4 is charged by current $I_1$ from source 5. Due to the reverse bias of diode 10, the storage current $i_2(t)$ flows in the direction shown by an arrow. Accordingly, the current $I(t)$ flowing through capacitor 4 is expressed by the following equation:

$$I(t) = I_1 + i_1(t) - i_2(t)$$

Assuming that the storage currents $i_1(t)$ and $i_2(t)$ flowing through diodes 2 and 10, respectively, are equal, then $$I(t) = I_1 + i_1(t) - i_2(t) = I_1$$

This means that the saw-tooth wave voltage appearing at the output terminal 6 is created solely by charging current $I_1$. Hence, its waveform is completely distortion free as shown by solid line 12 in FIG. 4.

Figure 4:
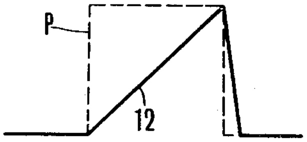
FIG. 4 shows the waveforms generated by the circuit shown in FIG. 3.
Figure 5:
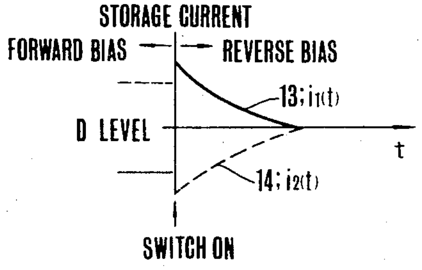
FIG. 5 is a plot to explain the operation of the circuit shown in FIG. 3.

FIG. 5 shows the relationship between the storage currents through diodes 2 and 10 shown in FIG. 3 in which curve 13 shows storage current $i_1(t)$ of diode 2 that flows toward juncture 3 whereas curve 14 shows storage current $i_2(t)$ of diode 10 flowing from juncture 3. It is thus clear that a saw-tooth wave free from distortion as shown in FIG. 4 can be produced by equalizing both curves 13 and 14.

Figure 6:
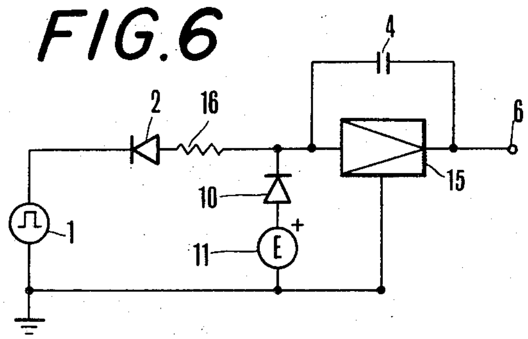
FIGS. 6 and 7 show modified embodiments of this invention.

FIG. 6 shows a connection diagram of the novel saw-tooth wave generator as applied to the well known Miller's integrating circuit comprising a capacitor 4 and an amplifier 15. In this embodiment, a resistor 16 is connected in series with the switching diode 2.

Figure 7:
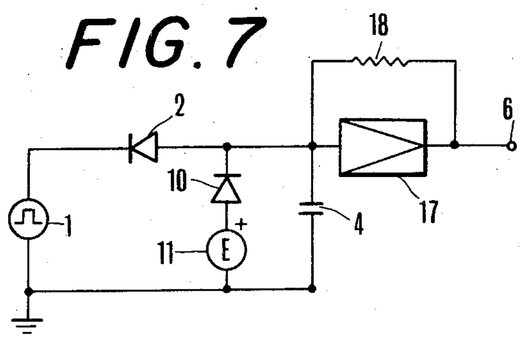

FIG. 7 shows an application of this invention to a boot strap circuit comprising an amplifier 17 and a shunt resistor 18. The storage current eliminating functions of these modifications are the same as that described in connection with FIG. 3. However, it should be understood that the characteristics of the Miller's integrating circuit and of the boot strap circuit are improved by the use of the invention.

As has been described in connection with FIG. 3, the storage current flowing through the switching diode 2 as a result of the application of the switching signal is compensated for by the storage current flowing through the second diode 10 so that it is essential that two diodes should have substantially the same characteristics. For this reason, in the circuit shown, in the absence of the switching signal, since the current flowing through diode 10 and the current $I_1$ from source 5 flows through switching diode 2 the current flowing through it is larger by $I_1$ than that flows through diode 10. As the storage time of the diode is proportional to the magnitude of the current flowing therethrough in the forward direction, where both diodes 2 and 10 have the same characteristics it is impossible to perfectly cancel out the storage current. For this reason, the perfect cancelation of the storage current can be realized when the diode 10 has longer storage time than diode 2.

Further, inasmuch as the voltage and the interval between the application of the switching signal and the nonconduction of the diode 10 have an influence upon the storage effect inherent thereto, in order to well attain the object of this invention, or in order to perfectly cancel out the effect of the storage current of the switching diode it is desirable to adjust the current through diode 10 or to vary the voltage of the constant voltage source 11.

Figure 8:
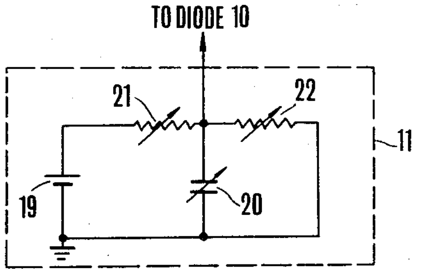
FIG. 8 shows one example of a variable voltage source utilized in this invention.

FIG. 8 illustrates one example of a constant voltage source 11 capable of adjusting the current that flows through diode 10 when it is rendered conductive. The circuit comprises a DC source 19, a capacitor 20 and variable resistors 20 and 21 connected as shown. One or more of the elements 20, 21 and 22 are constructed to be variable for adjusting the current flowing through diode 10. By this measure, it is possible to make symmetrical the storage current characteristics of diodes 10 and 2. The same purpose can also be accomplished by eliminating capacitor 20 and by decreasing the value of resistor 22 to a small value.

Instead of producing a saw-tooth wave of the positive polarity it is also possible to produce a saw-tooth wave of the negative polarity by reversing the polarities of the sources and the diodes.

It will thus be seen that the invention provides and improved saw-tooth wave generator constructed to generate a saw-tooth wave by the switching operation of a switching diode and by the charging and discharging of a capacitor and wherein the storage current of the switching diode is canceled by the storage current of an additional diode thereby producing a distortion free saw-tooth wave.

Figure 9:
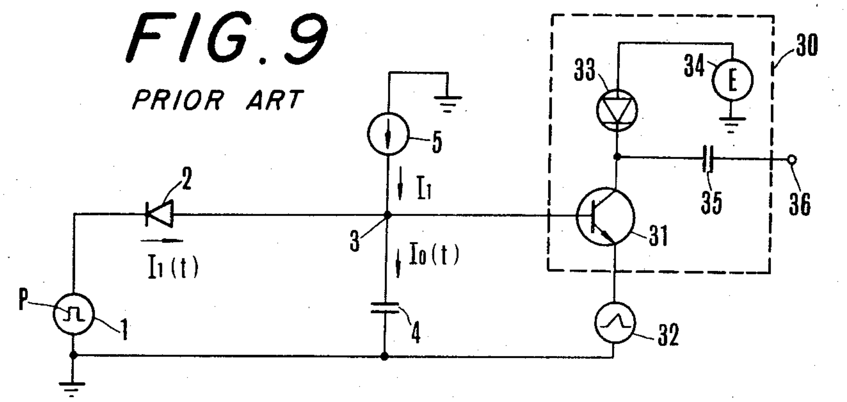
FIG. 9 PRIOR ART
FIG. 9 shows a connection diagram of a delayed pulse generator utilizing a prior art saw-tooth wave generator shown in FIG. 1.
Figures 10, 11:
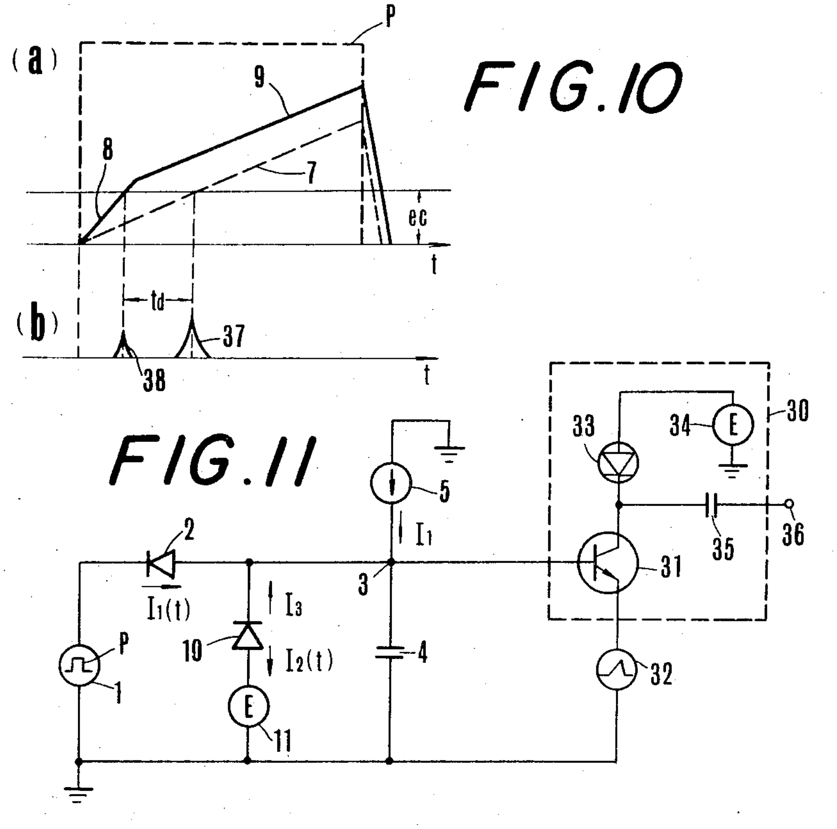
FIG. 11 shows a connection diagram of a delayed pulse generator employing the improved saw-tooth wave generator shown in FIG. 3.

FIG. 11 shows an improved delayed pulse generator which is similar to that shown in FIG. 9 except that a series circuit including a second diode 10 having a polarity opposite to that of switching diode 2 with reference to junction 3 or capacitor 4 and source of potential 11 is connected in parallel with capacitor 4 in the same manner as in FIG. 3. The operation of the delayed pulse generator shown in FIG. 11 is generally the same as that of the prior circuit shown in FIG. 9 except that the pulse 37 is generated at the desired time shown in FIG. 10. More particularly, as has been described in connection with FIGS. 9 and 10, due to the storage time of the switching diode the saw-tooth wave generated by the prior saw-tooth wave generator is distorted as shown by curves 8 and 9 shown in FIG. 10 with the result that the delayed pulse is generated as at 38 earlier than the desired time. However, since the effect of the storage current has been eliminated by the addition of the series circuit including the second diode 10 and source 4 the saw-tooth wave generated by the saw-tooth wave generator is straight or distortion free as shown by straight line 7. Thus, the delayed pulse is generated at the correct time as at 37.

Again, the source 4 may be made adjustable by using the circuit shown in FIG. 8. Further, the second diode 10 may be replaced by a variable capacitance diode. Further it will be clear that instead of utilizing a saw-tooth wave from variable source 32, a reference wave of a definite level could be used.

Thus, with the embodiment shown in FIG. 11 since the distortion of the saw-tooth wave generated by capacitor 4 is eliminated by compensating for the storage current or reverse current of the switching diode with a very simple circuit comprising a second diode and a voltage source it is possible to produce a delayed pulse precisely proportional to a reference signal.

Although the invention has been shown and described in terms of certain preferred embodiments of the invention it should be understood that the invention is not limited to the specific embodiments and applications illustrated and that many changes and modifications may be made without departing from the true spirit and scope of the invention as defined in the accompanying claims.

What is claimed is:

1. In a saw-tooth wave generator of the type comprising a capacitor, a source of switching signals, and switching diode connected between said capacitor and said source of switching signals so as to alternately charge and discharge said capacitor, the improvement which comprises a series circuit including a second diode and a source of voltage, said series circuit being connected in parallel with said capacitor and said second diode having the opposite polarity to that of said switching diode with reference to said capacitor so that the storage current of said switching diode is substantially compensated for by the storage current of said second diode.

2. The saw-tooth wave generator according to claim 1 wherein said switching diode and said second diode have substantially the same storage current characteristics.

3. The saw-tooth wave generator according to claim 1 wherein means are provided for varying the voltage of said source of voltage.

4. The saw-tooth wave generator according to claim 1 wherein said capacitor is within a Miller's integrating circuit together with an amplifier connected in parallel therewith.

5. The saw-tooth wave generator according to claim 1 wherein the output of said generator is applied to a boot strap circuit including an amplifier and a resistor connected in parallel therewith.

6. In a delayed pulse generator of the type comprising a combination of a saw-tooth wave generator and a comparator circuit connected to the output of said saw-tooth wave generator, said saw-tooth wave generator including a capacitor, a source of switching signals and a switching diode connected between said capacitor and said source of switching signals so as to alternately charge and discharge said capacitor, the improvement which comprises a series circuit including a second diode and a source of voltage, said series circuit being connected in parallel with said capacitor, and said second diode having the opposite polarity to that of said switching diode with reference to said capacitor so that the storage current of said switching diode is substantially compensated for by the storage current of said second diode.

7. The delayed pulse generator according to claim 6 wherein said comparator circuit comprises a source of reference saw-tooth waves synchronized with said switching signals and means to compare the saw-tooth waves generated by said saw-tooth wave generator with said reference saw-tooth waves.

8. The delayed pulse generator according to claim 6 wherein said comparator circuit comprises a source of reference saw-tooth waves, a transistor, the base electrode thereof being connected to the output terminal of said saw-tooth wave generator and the emitter electrode to said source of reference saw-tooth waves, an Ezaki diode with its cathode electrode connected to the collector electrode of said transistor, and an output terminal connected to the collector electrode of said transistor through a capacitor.

* * * * *

UNITED STATES PATENT OFFICE

CERTIFICATE OF CORRECTION

Patent No. 3,723,762 Dated ~~March 27, 1973~~

Inventor(s) Naohisa Nakaya

It is certified that error appears in the above-identified patent and that said Letters Patent are hereby corrected as shown below:

The title of the invention should be changed from

"SAW-TOOTH WAVE GENERATORS"

to

-- SAW-TOOTH WAVE GENERATOR FOR PROVIDING A DISTORTION-FREE SAW-TOOTH WAVE --

Signed and sealed this 27th day of November 1973.

(SEAL)
Attest:

EDWARD M.FLETCHER,JR.
Attesting Officer

RENE D. TEGTMEYER
Acting Commissioner of Patents